(12) United States Patent
Hosoda et al.

(10) Patent No.: US 7,903,506 B2
(45) Date of Patent: Mar. 8, 2011

(54) OPTICAL PICKUP DEVICE

(75) Inventors: Ryozo Hosoda, Daito (JP); Kazuhiro Takahashi, Daito (JP); Shinya Hatano, Daito (JP); Hiromasa Sasaoka, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 769 days.

(21) Appl. No.: 11/894,780

(22) Filed: Aug. 21, 2007

(65) Prior Publication Data

US 2008/0068960 A1    Mar. 20, 2008

(30) Foreign Application Priority Data

Aug. 21, 2006    (JP) .................................. 2006-224063

(51) Int. Cl.
G11B 7/00    (2006.01)

(52) U.S. Cl. ..................................... 369/44.15; 720/681

(58) Field of Classification Search .......... 369/683–687,
369/44.11, 44.14–44.16, 44.32, 44.33, 47.38,
369/47.45, 53.12–53.14, 53.19, 112.23, 112.24;
720/671, 681–687
See application file for complete search history.

(56) References Cited

U.S. PATENT DOCUMENTS

| 5,930,214 | A * | 7/1999 | Kasahara et al. ............. 369/53.2 |
| 7,111,311 | B2 | 9/2006 | Terashima | |
| 2001/0055265 | A1 * | 12/2001 | Obara ....................... 369/112.23 |
| 2002/0039342 | A1 * | 4/2002 | Maeda ....................... 369/112.23 |
| 2004/0109243 | A1 | 6/2004 | Orimo et al. | |
| 2005/0007906 | A1 | 1/2005 | Horinouchi et al. | |
| 2005/0036435 | A1 | 2/2005 | Haruguchi et al. | |
| 2005/0128897 | A1 * | 6/2005 | Yamasaki et al. .......... 369/44.27 |
| 2006/0018214 | A1 | 1/2006 | Fujii et al. | |
| 2007/0041286 | A1 * | 2/2007 | Hamatani .................. 369/44.14 |

FOREIGN PATENT DOCUMENTS

EP    1612778 A2    1/2006

(Continued)

OTHER PUBLICATIONS

Extended European Search Report for European Application No. 07016212.8-1232, mailed on Nov. 5, 2007 (7 pages).

(Continued)

*Primary Examiner* — Wayne R Young
*Assistant Examiner* — Aneeta Yodichkas
(74) *Attorney, Agent, or Firm* — Osha • Liang LLP (57) ABSTRACT

The present invention provides an optical pickup device capable of properly suppressing coma aberration which occurs due to a relative tilt error between objective lenses. The optical pickup device includes: first and second objective lenses having different optical characteristics; a lens holder provided with first and second lens receiving cylindrical parts to which the first and second objective lenses are attached so that distance from the first objective lens to an optical recording medium becomes shorter than distance from the second objective lens to the optical recording medium without overlapping the objective lenses; and a buffer member formed in a cylindrical shape so as to surround the periphery of the first objective lens, and having a projection for preventing collision between the first objective lens and the optical recording medium, the projection being provided at an end on the optical recording medium side. In the optical pickup device, the second objective lens is fixed in the lens receiving cylindrical part, and a lens tilt adjusting and holding structure for holding the first objective lens so that tilt of the first objective lens can be adjusted is added to the buffer member and the first lens receiving cylindrical part.

4 Claims, 9 Drawing Sheets

FOREIGN PATENT DOCUMENTS

| | | |
|---|---|---|
| JP | 10-11765 | 1/1998 |
| JP | 10-154342 | 6/1998 |
| JP | 11-23960 | 1/1999 |
| JP | 2001-67700 | 3/2001 |
| JP | 2004-185721 | 7/2004 |

OTHER PUBLICATIONS

Patent Abstracts of Japan for Japanese Publication No. 10-011765, Publication date Jan. 16, 1998 (1 page).

Patent Abstracts of Japan for Japanese Publication No. 2001-067700, Publication date Mar. 16, 2001 (1 page).

Patent Abstracts of Japan for Japanese Publication No. 11-023960, Publication date Jan. 29, 1999 (2 pages).

Patent Abstracts of Japan for Japanese Publication No. 10-154342, Publication date Jun. 9, 1998 (2 pages).

Patent Abstracts of Japan for Japanese Publication No. 2001-067700, Publication date Mar. 16, 2001 (1 page).

* cited by examiner

OPTICAL PICKUP DEVICE

BACKGROUND OF THE INVENTION

1. Field of the Invention

The present invention relates to an optical pickup device including a plurality of objective lenses having different optical characteristics.

2. Description of the Background Art

Some optical pickup devices include a plurality of kinds of objective lenses having optical characteristics corresponding to different kinds of optical recording medium such as a DVD (Digital Versatile Disc) and a Blu-ray Disc (trademark) in order to reproduce/record information from/to the optical recording medium. In such an optical pickup device, a plurality of kinds of objective lenses are attached to a single lens holder and used while being switched in accordance with the kind of an optical recording medium. Specifically, for example, at the time of reproducing information from a DVD, a laser beam emitted from a light source is condensed by an objective lens adapted to a DVD and the condensed light is emitted to the DVD. At the time of reproducing information from a Blu-ray Disc, a laser beam emitted from a light source is condensed by an objective lens adapted to a Blu-ray Disc and the condensed light is emitted to the Blu-ray Disc.

The working distance between an optical recording medium and an objective lens varies according to the kind of the optical recording medium and the objective lens. For example, the working distance between a Blu-ray Disc having a recording density higher than that of a DVD and an objective lens corresponding to a Blu-ray Disc is much shorter than that between a DVD and a corresponding objective lens because a laser beam having a shorter wavelength is condensed and the condensed laser beam is emitted. If the working distance becomes short to a certain extent, in the case such that focus servo is deviated, an objective lens and an optical recording medium collide with each other and are damaged. Consequently, a buffer member as disclosed in, for example, Japanese Patent Application Laid-Open Nos. 2004-185721 and 2001-67700 is provided near the objective lens having the shorter working distance, thereby preventing collision between the objective lens and an optical recording medium.

In a light spot formed by condensing a laser beam by an objective lens onto an optical recording medium, coma aberration occurs due to a manufacture error in the objective lens or an error of attachment to a lens holder. When coma aberration becomes large to a certain degree, the reproduction performance and the recording performance deteriorate. Consequently, as disclosed in the paragraph [0002] in Japanese Patent Application Laid-Open No. H10-154342 and the paragraph [0003] in Japanese Patent Application Laid-Open No. H11-23960, by adjusting the angle of attaching the lens holder to a fixed member, the tilt of an objective lens fixed to the lens holder is changed to correct coma aberration.

However, in the case of fixing a plurality of kinds of objective lenses in a single lens holder, the objective lenses are not always fixed by the lens holder so that the tilting directions of the objective lenses capable of eliminating coma aberration which occurs in the objective lenses become the same. Consequently, even when the objective lenses in the lens holder are tilted in the same direction to correct coma aberration which occurs in one of the objective lenses, there is the possibility that coma aberration which occurs in the other objective lens becomes very large. In Japanese Patent Application Laid-Open No. H10-154342, the first objective lens is mounted and fixed on a first bearing surface so that the direction of a tilt of the first bearing surface with respect to a second bearing surface provided for the lens holder and the direction of coma aberration in the first objective lens are opposite to each other, thereby suppressing worsening of the coma aberration occurring in the first objective lens due to elimination of the coma aberration in the second objective lens simply fixed to the second bearing surface (without considering the direction of coma aberration). Japanese Patent Application Laid-Open No. H11-23960 discloses design specifications and parameters of the objective lenses for suppressing worsening of coma aberration occurring in one of the objective lenses caused by elimination of the coma aberration in the other objective lens.

However, Japanese Patent Application Laid-Open Nos. H10-154342 and H11-23960 disclose only the conditions of attaching the objective lenses to the lens holder and the design specifications and parameters of the objective lenses. Therefore, the techniques cannot properly correct coma aberration caused by a relative tilt error between the objective lenses when components of the optical pickup device are actually combined.

The present invention has been achieved to solve the problem and an object of the invention is to provide an optical pickup device capable of properly suppressing coma aberration caused by a relative tilt error between objective lenses.

SUMMARY OF THE INVENTION

The present invention provides an optical pickup device including: first and second objective lenses having different optical characteristics; a lens holder provided with first and second lens receiving cylindrical parts to which the first and second objective lenses are attached, respectively, so that distance from the first objective lens to the optical recording medium becomes shorter than distance from the second objective lens to the optical recording medium without overlapping the objective lenses; and a buffer member formed in a cylindrical shape so as to surround the periphery of the first objective lens, and having a projection for preventing collision between the first objective lens and the optical recording medium, the projection being provided at an end on the optical recording medium side. The second objective lens is fixed in the second lens receiving cylindrical part, and a lens tilt adjusting and holding structure for holding the first objective lens so that tilt of the first objective lens can be adjusted is added to the buffer member and the first lens receiving cylindrical part.

With the configuration, after a tilt adjustment of the second objective lens with respect to an optical recording medium, a tilt of the first objective lens with respect to an optical recording medium, the lens holder, and the second objective lens can be adjusted by the lens tilt adjusting and holding structure. Consequently, coma aberration which occurs due to a relative tilt error between the objective lenses when the components of the optical pickup device are actually combined can be properly suppressed by the tilt adjustment. After attachment of the objective lenses to the lens receiving cylindrical parts of the lens holder, the coma aberration can be corrected by adjusting the tilt of each of the objective lenses. Consequently, it becomes unnecessary to strictly manage the dimensional precision of the objective lenses and the lens receiving cylindrical parts so that the objective lenses can be attached to the lens receiving cylindrical parts always in a predetermined state, manufacture of the parts becomes easier, and productivity can be improved. Since the lens tilt adjusting and holding structure is added to the buffer member and the first lens receiving cylindrical part of the lens holder, it is unnecessary to separately manufacture and employ a member dedicated to adjust the tilt of the first objective lens with respect to the lens holder and the second objective lens. Thus, increase in the manufacture cost can be suppressed. Further, the coma aberration which occurs in the second objective lens is corrected by adjusting the tilt of the second objective lens together with the lens holder and, after that, the coma aberration which occurs in the first objective lens is corrected by adjusting the tilt of the first objective lens by the lens tilt adjusting and holding structure. Therefore, even when the laser beam is condensed by any of the objective lenses and emitted to the optical recording medium, coma aberration which occurs in a light spot formed on the optical recording medium can be properly suppressed, and the reproducing performance or recording performance of the optical pickup device can be improved.

In an embodiment of the present invention, in the optical pickup device described above, the lens tilt adjusting and holding structure includes: a support part provided on an inner face of the buffer member and supporting the first objective lens from the optical recording medium side; a flange provided on an outer face of the buffer member; a through hole provided in the flange; a female screw hole provided around the first lens receiving cylindrical part of the lens holder; a screw that penetrates the through hole and screws in the female screw hole, thereby attaching the buffer member to the lens holder; and a spring provided between the first objective lens and the first lens receiving cylindrical part and generating elastic force of pressing the first objective lens toward the optical recording medium.

With the configuration, the first objective lens is supported from the side opposite to the optical recording medium by the spring disposed in the first lens receiving cylindrical part in the lens holder. While covering the periphery of the first objective lens with the buffer member, the first objective lens is supported from the optical recording medium side by the support part in the buffer member. The screw is allowed to penetrate the through hole in the flange of the buffer member to screw in the female screw hole in the first lens receiving cylindrical part, thereby attaching the buffer member to the lens holder. In such a manner, the first objective lens held by the buffer member and the first lens receiving cylindrical part can be attached to the lens holder. By precisely changing the screw amount in the female screw hole of the screw, a tilt of the first objective lens is accurately finely adjusted together with the buffer member, and the coma aberration occurring in the first objective lens can be corrected as aimed. By using a general screw and a general spring as the screw and the spring separate from the lens holder and the buffer member, the manufacture cost can be suppressed.

In an embodiment of the present invention, in the optical pickup device described above, a plurality of through holes, a plurality of female screw holes, and a plurality of screws are provided at predetermined angle intervals around the buffer member and the first lens receiving cylindrical part.

With the configuration, by changing the screw amount in each of the female screw holes of each of the screws, the tilt of the first objective lens can be adjusted in multiple directions, and coma aberration which occurs in the first objective lens can be accurately corrected.

In an embodiment of the present invention, in the optical pickup device described above, an engagement part that engages with the spring is provided for each of the first objective lens and the first lens receiving cylindrical part.

With the configuration, the center of the valid part transmitting a laser beam of the first objective lens can be reliably prevented from being deviated from the optical axis of the laser beam, and the optical characteristics of the first objective lens can be fully displayed.

Further, in a typical embodiment of the present invention, an optical pickup device includes: a first objective lens for condensing a laser beam having a short wavelength onto an optical recording medium; a second objective lens for condensing a laser beam having a long wavelength onto an optical recording medium; a lens holder provided with first and second lens receiving cylindrical parts to which the first and second objective lenses are attached, respectively, so that distance from the first objective lens to the optical recording medium becomes shorter than distance from the second objective lens to the optical recording medium without overlapping the objective lenses; and a buffer member formed in a cylindrical shape so as to surround the periphery of the first objective lens, having a projection for preventing collision between the first objective lens and the optical recording medium, the projection being provided at an end on the optical recording medium side, and having excellent slidability. The second objective lens is fixed in the second lens receiving cylindrical part, and a lens tilt adjusting and holding structure for holding the first objective lens so that tilt of the first objective lens can be adjusted is added to the buffer member and the first lens receiving cylindrical part. The lens tilt adjusting and holding structure includes: a support part provided on an inner face of the buffer member and supporting the first objective lens from the optical recording medium side; a flange provided on an outer face of the buffer member; three through holes provided at equal angle intervals in the flange; three female screw holes provided at equal angle intervals around the first lens receiving cylindrical part of the lens holder; three screws that penetrate the through holes and screw in the female screw holes, thereby attaching the buffer member to the lens holder; a spring provided between the first objective lens and the first lens receiving cylindrical part and generating elastic force of pressing periphery of the first objective lens toward the optical recording medium; and an engagement part provided for each of the first objective lens and the first lens receiving cylindrical part and engaging with the spring.

With the configuration, after the tilt adjustment of the second objective lens with respect to an optical recording medium, the tilt of the first objective lens with respect to the optical recording medium, the lens holder, and the second objective lens can be adjusted by the lens tilt adjusting and holding structure. Thus, coma aberration which occurs due to a relative tilt error between the objective lenses when the components of the optical pickup device are actually combined can be properly suppressed. In particular, by changing the screw amounts of the three screws in the female screw holes, the tilt of the first objective lens can be adjusted in three axes in multiple directions such as the tangential tilt direction and the radial tilt direction, and the coma aberration can be accurately corrected. In addition, by making the spring come into engagement with the engagement parts in the first objective lens and the first lens receiving cylindrical part, the center of the valid part transmitting the laser beam of the first objective lens can be reliably prevented from being deviated from the optical axis of the laser beam. Therefore, the optical characteristic of the first objective lens can be fully displayed. It becomes unnecessary to strictly manage the dimensional precision of the objective lenses and the lens receiving cylindrical parts so that the objective lenses can be attached to the lens receiving cylindrical parts always in a predetermined state, manufacture of the parts becomes easier, and productivity can be improved. It is also unnecessary to separately manufacture and employ a member dedicated to adjust the tilt of the first objective lens with respect to the lens holder. Thus, increase in the manufacture cost can be suppressed. Further, the coma aberration which occurs in the second objective lens is corrected by adjusting the tilt of the second objective lens together with the lens holder and, after that, the coma aberration which occurs in the first objective lens is corrected by adjusting the tilt of the first objective lens by the lens tilt adjusting and holding structure. Therefore, even when the laser beam is condensed by any of the objective lenses and emitted to the optical recording medium, coma aberration which occurs in a light spot formed on the optical recording medium can be properly suppressed, and the reproducing performance or recording performance of the optical pickup device can be improved.

According to the present invention, after adjustment of the tilt of the second objective lens with respect to the optical recording medium, the tilt of the first objective lens with respect to the optical recording medium, the lens holder, and the second objective lens can be adjusted by the lens tilt adjusting and holding structure added to the buffer member and the first lens receiving cylindrical part. Consequently, coma aberration caused by a relative tilt error between the objective lenses when the components of the optical pickup device are actually combined can be properly suppressed.

DESCRIPTION OF THE PREFERRED EMBODIMENTS

Figure 1:
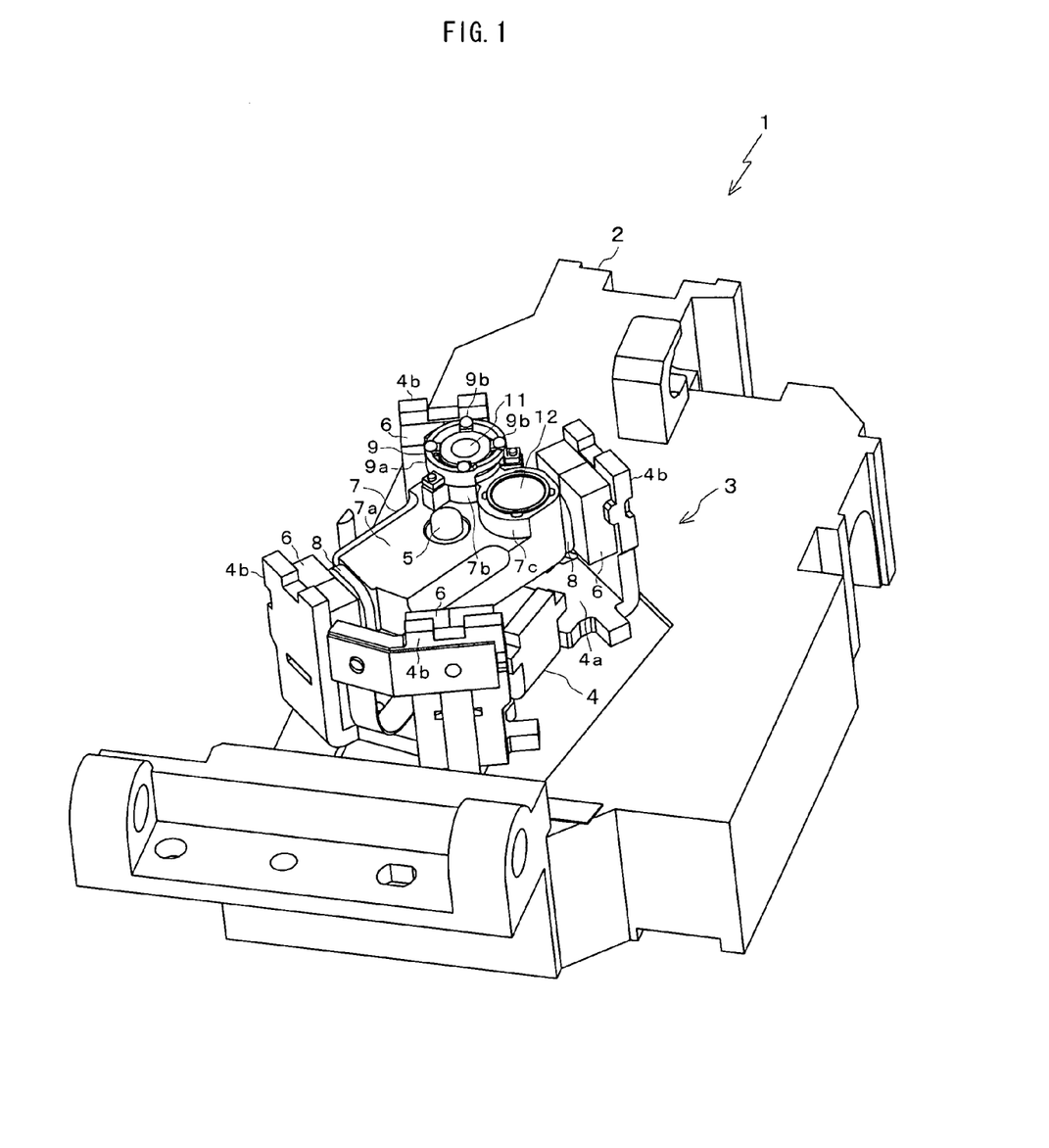
FIG. 1 is a perspective view of an optical pickup device according to an embodiment of the present invention.

FIG. 1 is a perspective view generally showing an optical pickup device 1 according to an embodiment of the present invention. The optical pickup device 1 is mounted on a multi-type disc player, disc recorder, or the like for reproducing/recording information from/to a DVD (Digital Versatile Disc) and a Blu-ray Disc as an example of an optical recording medium.

A base 2 of the optical pickup device 1 is a fixed member which is fixed to a chassis of a disc player or the like. To the base 2, parts such as various optical systems and drive systems are attached. In FIG. 1, only an actuator 3 attached on the base 2 is shown. A shaft 5 is fixed so as to penetrate the center of a body 4a of a base 4 of the actuator 3. The base 4 and the shaft 5 are attached with a predetermined tilt to the top face of the base 2. The base 4 has four side parts 4b bent upright from the body 4a. The body 4a is perpendicular to the shaft 5, and the side parts 4b are parallel with the shaft 5. Magnets 6 are fixed to the inner surfaces facing each other of the side parts 4b.

A lens holder 7 is mounted on the center of the base 4. The shaft 5 penetrates in the center of the body 7a of the lens holder 7, and the lens holder 7 is rotatably supported by the shaft 5. A body 7a is perpendicular to the shaft 5. Magnet coils 8 are fixed to the side faces of the body 7a. On one side of the body 7a, lens receiving cylindrical parts 7b and 7c to which objective lenses 11 and 12 are attached without being overlapped are formed. The axial direction of the lens receiving cylindrical parts 7b and 7c are parallel with the shaft 5.

The optical characteristics of the objective lenses 11 and 12 are different from each other. The objective lens 11 is designed so as to condense a laser beam having a short wavelength onto a Blu-ray Disc having a high recording density. The objective lens 12 is designed to condense a laser beam having a long wavelength onto a DVD having a recording density lower than that of a Blu-ray Disc. An optical recording medium (Blu-ray Disc or DVD) is set in a predetermined position above the objective lenses 11 and 12 in FIG. 1. Since the working distance between the Blu-ray Disc and the objective lens 11 is shorter than that between the DVD and the objective lens 12, the heights of the lens receiving cylindrical parts 7b and 7c are designed so that the distance to the optical recording medium of the objective lens 11 is shorter than that of the objective lens 12.

A buffer member 9 is attached on the lens receiving cylindrical part 7b. The body 9a of the buffer member 9 is formed in a cylindrical shape so as to surround the objective lens 11. At the end of the optical recording medium side (upper side) of the body 9a, four projections 9b are provided to prevent collision between the objective lens 11 and the optical recording medium. To prevent the optical recording medium from being damaged, the buffer member 9 is made of a material having excellent slidability such as POM (polyoxymethylene) resin, silicon rubber, or the like.

Figure 2:
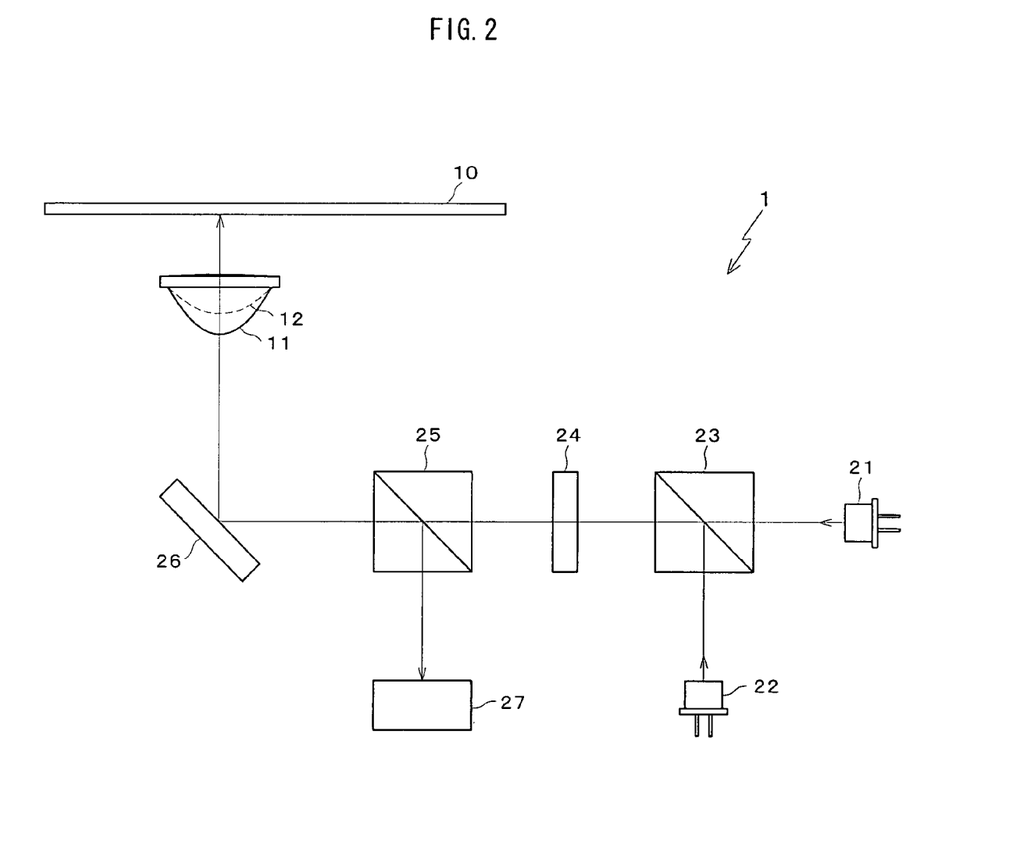
FIG. 2 is a configuration diagram of an optical system of the optical pickup device.

FIG. 2 is a schematic configuration diagram of an optical system in the optical pickup device 1. Light sources 21 and 22, prisms 23 and 25, a collimate lens 24, and a reflecting mirror 26 are mounted on the inside of the base 2 of the optical pickup device 1. The objective lenses 11 and 12 are mounted in the actuator 3 attached on the base 2 as described above. An optical recording medium 10 such as a Blu-ray Disc or DVD is set above the objective lenses 11 and 12. The light source 21 is a semiconductor laser device that emits a laser beam having a short wavelength according to a Blu-ray Disc. The light source 22 is a semiconductor laser device that emits a laser beam having a long wavelength according to a DVD.

The laser beam emitted from the light source 21 passes straight through the prism 23 and enters the collimate lens 24. The direction of the laser beam emitted from the light source 22 is changed by the prism 23 and the laser beam enters the collimate lens 24. The laser beam incident on the collimate lens 24 is converted to parallel rays. The parallel rays pass through the prism 25 and are reflected upward by the reflecting mirror 26. The parallel rays enter the objective lens 11 or 12 positioned just above the mirror 26. In the operations, a laser beam according to the kind of the optical recording medium 10 is emitted from the light source 21 or 22. The lens holder 7 rotates about the shaft 5 as a center by magnetic fields generated by the magnet coils 8 of the actuator 3 and the magnets 6 in FIG. 1, and the objective lens 11 or 12 according to the kind of the optical recording medium 10 is positioned just above the reflecting mirror 26. That is, according to the kind of the optical recording medium 10, the light source 21 or 22 and the objective lens 11 or 12 to be used are switched.

The laser beam incident on the objective lens 11 or 12 is condensed by the lens 11 or 12, and irradiated to the optical recording medium 10. The light reflected by the optical recording medium 10 passes through the objective lens 11 or 12, the direction of the light is bent by the reflecting mirror 26 and the prism 25, and the resultant light is received by a photodetector 27. The photodetector 27 converts the received light to an electric signal and detects a reproduction signal, a tracking error signal, a focusing error signal, or the like. In the operations, by the magnetic fields between the magnet coils 8 of the actuator 3 and the magnets 6, the objective lenses 11 and 12 are moved together with the lens holder 7 in the focusing direction perpendicular to the optical recording medium 10 to perform focusing servo, or in the tracking direction parallel to the optical recording medium 10 to perform tracking servo.

Figure 3:
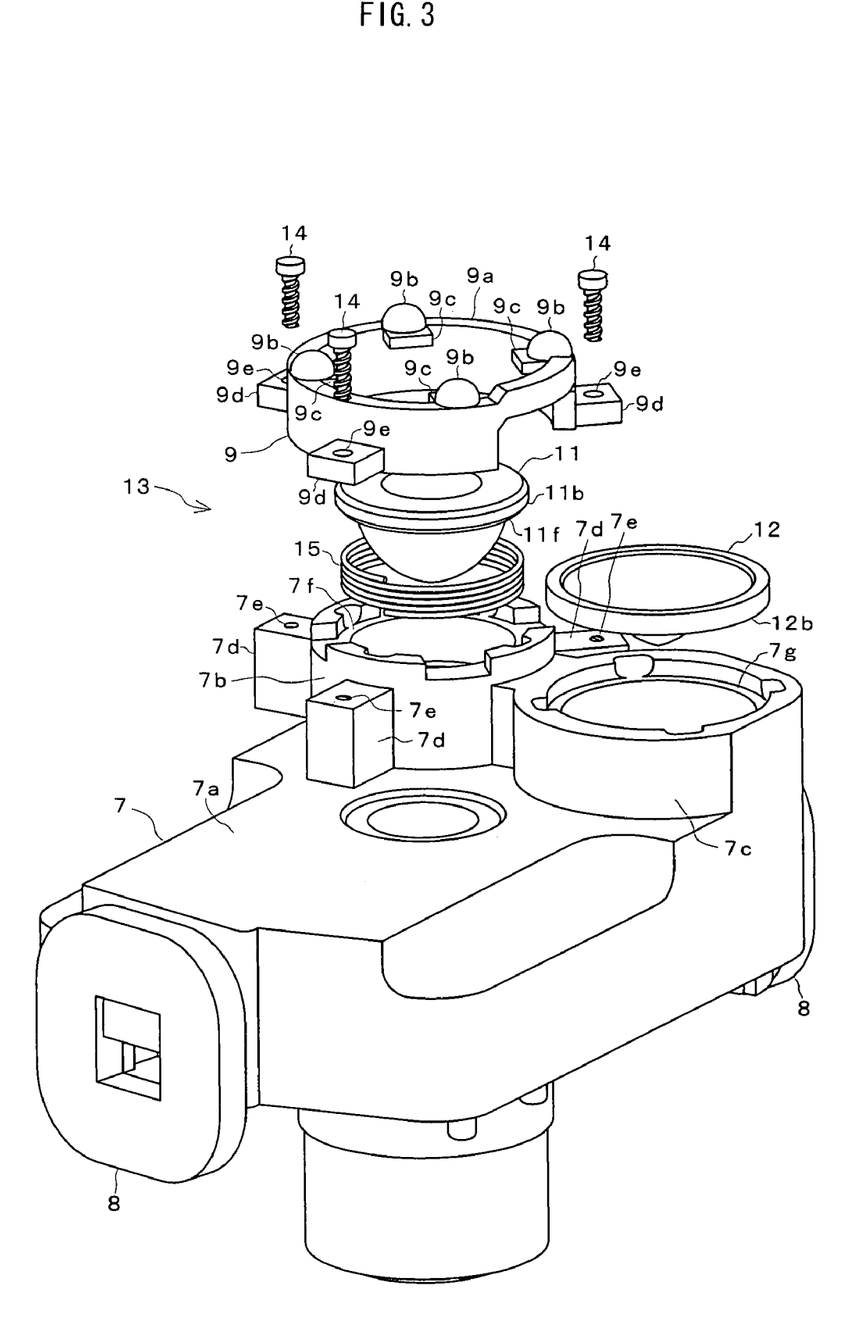
FIG. 3 is an exploded perspective view of a lens holder in the optical pickup device.
Figure 4:
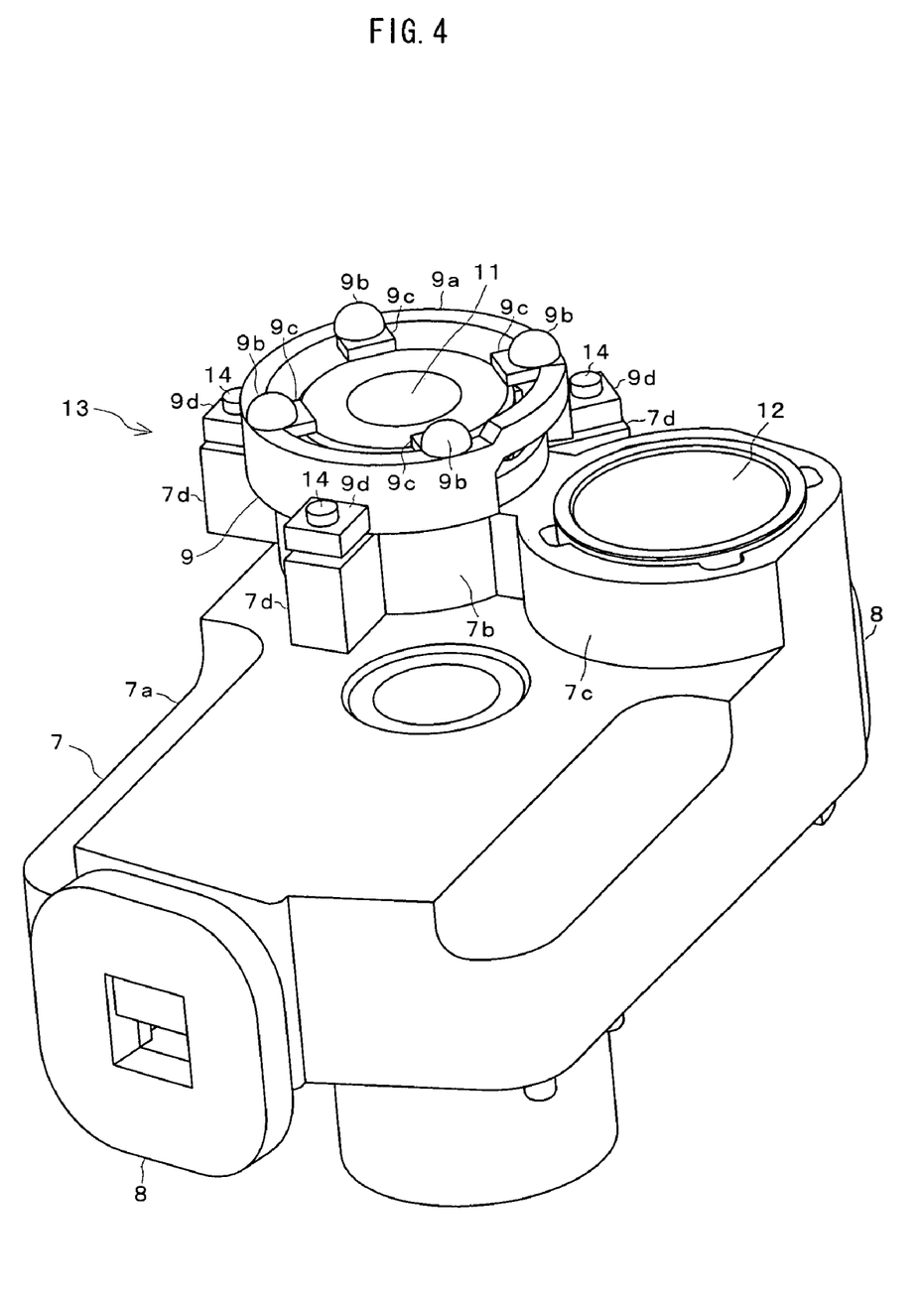
FIG. 4 is an assembly perspective view of the lens holder in the optical pickup device.
Figure 5:
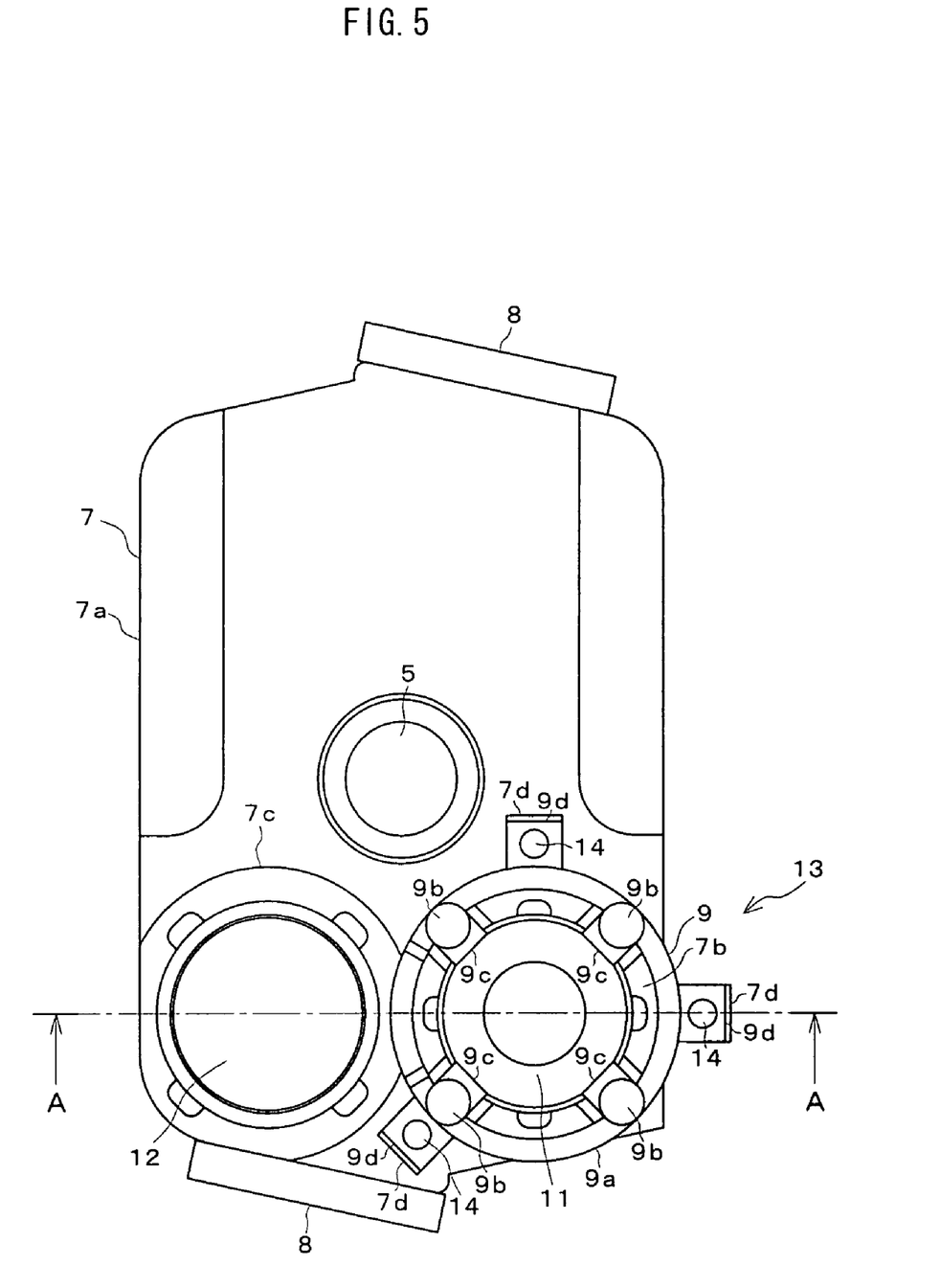
FIG. 5 is an assembly plan view of the lens holder in the optical pickup device.
Figure 6:
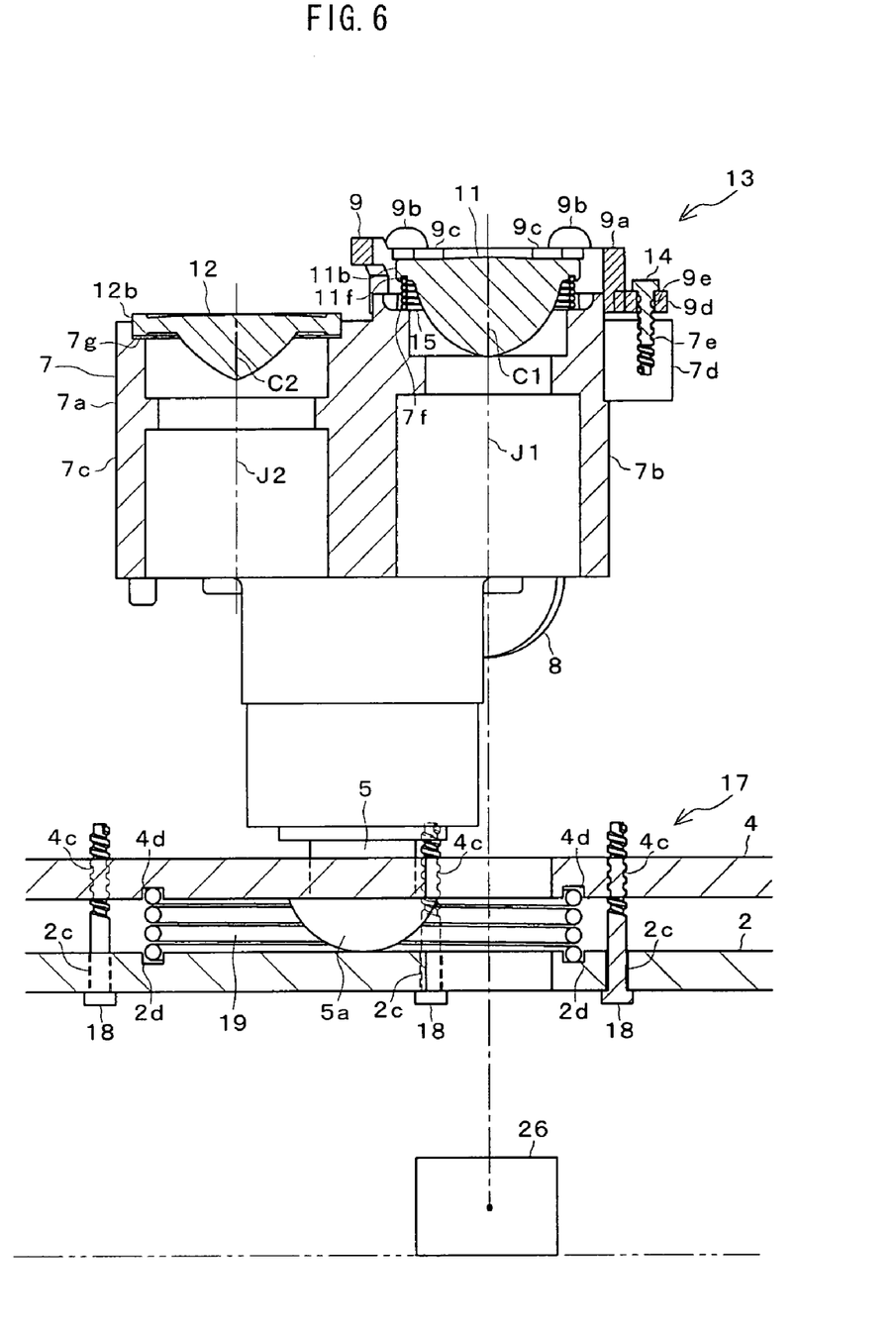
FIG. 6 is a cross section of the lens holder in the optical pickup device.

FIG. 3 is a perspective view showing an exploded state of main components of the lens holder 7. FIG. 4 is a perspective view showing an assembled state of the lens holder 7. FIG. 5 is a plan view showing an assembled state of the lens holder 7. FIG. 6 is a cross section taken along line A-A of FIG. 5.

As shown in FIG. 3, a lens tilt adjusting and holding structure 13 for holding the objective lens 11 so that the tilt can be adjusted is added to the buffer member 9 and the lens receiving cylindrical part 7b of the lens holder 7. The lens tilt adjusting and holding structure 13 is constructed by a support part 9c, a flange 9d, and a through hole 9e of the buffer member 9, a female screw hole 7e in the lens holder 7, an engagement part 7f of the lens receiving cylindrical part 7b, a precision screw 14, a coil spring 15, and an engagement part 11f of the objective lens 11.

At the upper end of the inner surface of the body 9a of the buffer member 9, the four support parts 9c are formed so as to project to the inside perpendicularly to the axial direction of the body 9a. On the support parts 9c, aforementioned projections 9b are formed. The support part 9c supports the objective lens 11 from the optical recording medium 10 side (from the above in FIG. 3) so as not to interrupt a laser beam passing through the objective lens 11. At the lower end of the outer surface of the body 9a, three flanges 9d are formed so as to project to the outside perpendicularly to the axial direction of the body 9a. In the flanges 9d, three through holes 9e are formed in parallel with the body 9a and at equal angle (120°) intervals.

Around the lens receiving cylindrical part 7b of the lens holder 7, three stands 7d are formed with a predetermined height in correspondence with the flanges 9d of the buffer member 9. In the stands 7d, three female screw holes 7e are formed concentrically with the through holes 9e of the buffer member 9. A step-shaped engagement part 7f that engages with the side opposite to the optical recording medium 10 (the lower end in FIG. 3) of the coil spring 15 is formed on the inside of an upper part of the lens receiving cylindrical part 7b. The engagement part 7f is formed in a size so that it can support the coil spring 15 and in which a circumferential end 11b of the objective lens 11 can be fit.

The head of each of the precision screws 14 is larger than the through hole 9e in the buffer member 9. The screw part of the precision screw 14 can penetrate the through hole 9e and screw in the female screw hole 7e in the lens holder 7. By screwing the precision screws 14 in the female screw holes 7e through the through holes 9e, the buffer member 9 is attached to the upper part of the lens receiving cylindrical part 7b in the lens holder 7.

Figure 7:
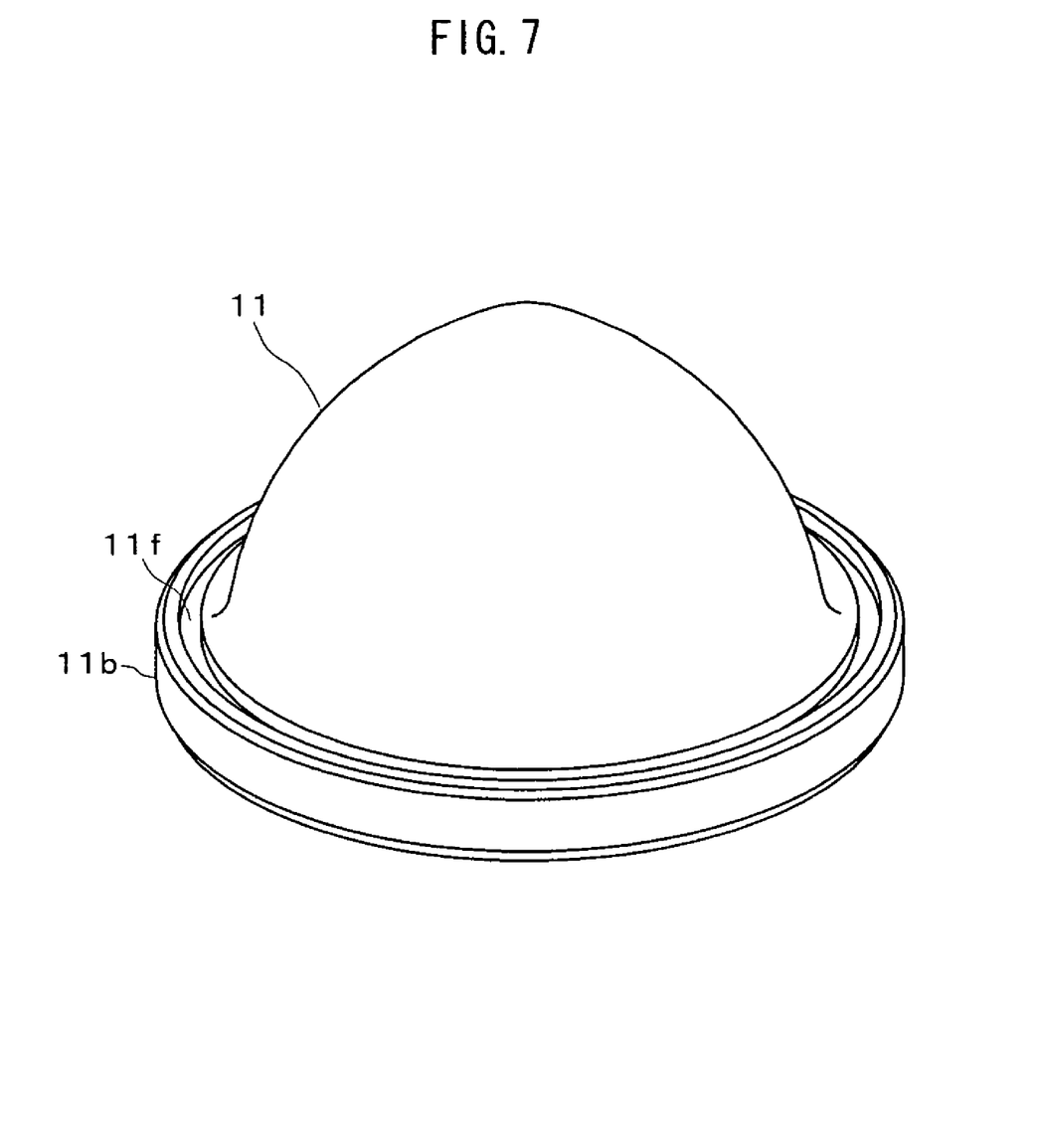
FIG. 7 is a perspective view of an objective lens in the optical pickup device.

The coil spring 15 is mounted between the circumferential end 11b of the objective lens 11 and the engagement part 7f of the lens receiving cylindrical part 7b. The coil spring 15 generates elastic force of pressing the circumferential end 11b of the objective lens 11 toward the optical recording medium 10 (upward in FIG. 3). That is, the coil spring 15 supports the objective lens 11 from the side opposite to the optical recording medium 10 (from beneath in FIG. 3) so as not to interrupt the laser beam passing through the objective lens 11. The precision screw 14 and the coil spring 15 are not special-purpose items but general-purpose items. In the face on the side opposite to the optical recording medium 10 (under face in FIG. 3) of the circumferential end 11b of the objective lens 11, the engagement part 11f which engages with the side of the optical recording medium 10 (the upper end in FIG. 3) of the coil spring 15 is formed. The engagement part 11f is formed in a groove shape as shown in FIG. 7. The groove width of the engagement part 11f is slightly larger than the diameter of the wire rod of the coil spring 15.

On the inside of an upper part of the lens receiving cylindrical part 7c of the lens holder 7, a step-shaped engagement part 7g to which a circumferential end 12b of the objective lens 12 is fitted and engaged is formed. The objective lens 12 is fixed by an adhesive or the like in a state where the circumferential end 12b engages with the engagement part 7g in the lens receiving cylindrical part 7c as shown in FIGS. 4 to 6. In the fixed state, as shown in FIG. 6, a center C2 of a valid part transmitting the laser beam in the objective lens 12 coincides with the axis J2 of the lens receiving cylindrical part 7c, that is, the optical axis of the laser beam passing through the lens receiving cylindrical part 7c.

An actuator tilt adjusting and attaching structure 17 for attaching the actuator 3 so that the tilt of the actuator 3 can be adjusted is added around the shaft 5 at the bases 2 and 4. The actuator tilt adjusting and attaching structure 17 is constructed by a hemispherical part 5a of the shaft 5, a female screw hole 4c and an engagement part 4d in the base 4, a through hole 2c and an engagement part 2d in the base 2, a precision screw 18, and a coil spring 19.

The hemispherical part 5a is formed on the side opposite to the optical recording medium 10 (the lower end in FIG. 6) of the shaft 5. The hemispherical part 5a projects from the body 4a of the base 4 and is in contact with the surface of the base 2. As described above, the shaft 5 is fixed to the base 4 while penetrating the body 4a of the base 4, and rotatably supports the lens holder 7 while penetrating the body 7a of the lens holder 7. Around the shaft 5 at the body 4a of the base 4, three female screw holes 4c are formed in parallel with the shaft 5 and at equal angle (120°) intervals. Around the shaft 5 at the body 4a, the engagement part 4d which engages with the side opposite to the optical recording medium 10 (the upper end in FIG. 6) of the coil spring 19 is also formed. In the base 2, three through holes 2c are formed concentrically with the female screw holes 4c in the base 4. In the base 2, the engagement part 2d which engages with the side opposite to the optical recording medium 10 of the coil spring 19 (the lower end in FIG. 6) is also formed.

The head of each precision screw 18 is larger than the through hole 2c in the base 2. The screw part of the precision screw 18 can penetrate the through hole 2c and screw in the female screw hole 4c in the base 4. By screwing the precision screws 18 in the female screw holes 4c through the through holes 2c, the base 4, the shaft 5, and the lens holder 7 are attached onto the base 2. The coil spring 19 is mounted while engaging with the engagement parts 2d and 4d of the bases 2 and 4. The coil spring 19 generates elastic force of pressing the body 4a of the base 4 toward the optical recording medium 10 (upward in FIG. 6). The precision screw 18 and the coil spring 19 are not special-purpose items but general-purpose items.

At the time of combining the parts of the actuator 3 and the base 2 with each other, first, as shown in FIG. 1, the magnet 6 is fixed to the base 4 of the actuator 3 and the shaft 5 is allowed to penetrate and is fixed. As shown in FIG. 1 and FIGS. 4 to 6, the magnet coil 8, the objective lenses 12 and 11, and the buffer member 9 are attached to the lens holder 7. A method of attaching the objective lens 12 to the lens receiving cylindrical part 7c is as described above.

As a method of attaching the objective lens 11 and the buffer member 9 to the lens receiving cylindrical part 7b of the lens holder 7, first, the coil spring 15 is set by being engaged with the engagement part 7f in the lens receiving cylindrical part 7b in FIG. 3. Next, the coil spring 15 is engaged with the engagement part 11f of the objective lens 11 to support the objective lens 11 from the side opposite to the optical recording medium 10. Next, the buffer member 9 is mounted on the objective lens 11 so as to surround the objective lens 11, the coil spring 15, and the lens receiving cylindrical part 7b, and the objective lens 11 is supported from the optical recording medium 10 side by the support part 9c of the buffer member 9. Then the precision screw 14 is inserted through the through hole 9e in the flange 9d of the buffer member 9 and screws in the female screw hole 7e in the stand 7d of the lens receiving cylindrical part 7b, thereby attaching the buffer member 9 to the lens holder 7. In such a manner, as shown in FIGS. 4 to 6, the objective lens 11 can be held by the buffer member 9 and the lens receiving cylindrical part 7b and attached to the lens holder 7.

After that, the lens holder 7 is rotatably supported by the shaft 5 and attached onto the base 4 as shown in FIGS. 1 and 6. Next, as shown in FIG. 6, the coil spring 19 is engaged with the engagement parts 2d and 4d of the bases 2 and 4, respectively, the hemispherical part 5a of the shaft 5 is mounted on the base 2, and the precision screw 18 is allowed to penetrate the through hole 2c in the base 2 and screws in the female screw hole 4c in the base 4, thereby attaching the base 4, the shaft 5, the lens holder 7, and the like onto the base 2. Then, by accurately adjusting the screw amount of the precision screw 18 in the female screw hole 4c, the tilt of the objective lens 12 in the tangential tilt direction, the radial tilt direction, and the like with respect to the base 2 and the optical recording medium 10 is finely adjusted together with the base 4, the shaft 5, and the lens holder 7. Consequently, coma aberration which occurs in the objective lens 12 can be corrected as aimed. It is also possible to attach the objective lens 11 to the lens holder 7 after adjusting the tilt of the objective lens 12.

Finally, the screw amount in the female screw hole 7e of the precision screw 14 on the lens holder 7 is accurately adjusted, and the tilt of the objective lens 11 in the tangential tilt direction, the radial tilt direction, and the like with respect to the objective lens 12, the lens holder 7, the optical recording medium 10, and the like is finely adjusted together with the buffer member 9. Consequently, coma aberration which occurs in the objective lens 11 can be corrected as aimed. Since the coil spring 15 engages with the engagement part 11f of the objective lens 11 and the engagement part 7f in the lens receiving cylindrical part 7b, as shown in FIG. 6, the center C1 of the valid part transmitting the laser beam in the objective lens 11 is not deviated from the axis of the lens receiving cylindrical part 7b, that is, the optical axis J1 of the laser beam reflected by the reflecting mirror 26 and passing through the lens receiving cylindrical part 7b.

According to the above-described manner, the tilt of the objective lens 12 with respect to the base 2 and the optical recording medium 10 is adjusted and, after that, the tilt of the objective lens 11 with respect to the optical recording medium 10, the lens holder 7, the objective lens 12, and the like can be adjusted by the lens tilt adjusting and holding structure 13. Thus, by the tilt adjustment, coma aberration which occurs due to a relative tilt error between the objective lenses 11 and 12 when the components of the optical pickup device 1 are actually combined can be properly suppressed.

Since three through holes 9e, three female screw holes 7e, and three precision screws 14 are provided at equal angle intervals around the buffer member 9 and the lens receiving cylindrical part 7b, by accurately changing the screw amount in the female screw holes 7e of the precision screws 14, the tilt of the objective lens 11 can be adjusted precisely in multiple directions such as the tangential tilt direction and the radial tilt direction, and coma aberration which occurs in the objective lens 11 can be accurately corrected.

By providing the engagement parts 11f and 7f engaging with the coil spring 15 on the inside of the circumferential end 11b of the objective lens 11 and on the inside of the upper part of the lens receiving cylindrical part 7b respectively, the center C1 of the valid part transmitting the laser beam of the objective lens 11 can be reliably prevented from being deviated from the optical axis J1 of the laser beam passing through the lens receiving cylindrical part 7b. Therefore, the optical characteristic of the objective lens 11 can be fully displayed.

The coma aberration can be corrected by adjusting the tilt of each of the objective lenses 11 and 12 after attachment of the objective lenses 11 and 12 to the lens receiving cylindrical parts 7b and 7c of the lens holder 7. Consequently, it becomes unnecessary to strictly manage the dimensional precision of the objective lenses 11 and 12 and the lens receiving cylindrical parts 7b and 7c so that the objective lenses 11 and 12 can be attached to the lens receiving cylindrical parts 7b and 7c always in a predetermined state, manufacture of the parts 11, 12, 7, and 9 becomes easier, and productivity can be improved.

Since the lens tilt adjusting and holding structure 13 is added to the buffer member 9 and the lens receiving cylindrical part 7b of the lens holder 7, it is unnecessary to separately manufacture and employ a member dedicated to adjust the tilt of the objective lens 11 with respect to the lens holder 7 and the objective lens 12. Thus, increase in the manufacture cost can be suppressed.

Further, the coma aberration which occurs in the objective lens 12 is corrected by adjusting the tilt of the objective lens 12 together with the lens holder 7, the base 4, and the shaft 5 and, after that, the coma aberration which occurs in the objective lens 11 is corrected by adjusting the tilt of the objective lens 11 by the lens tilt adjusting and holding structure 13. Therefore, even when the laser beam is condensed by any of the objective lenses 11 and 12 and emitted to the optical recording medium 10, coma aberration which occurs in a light spot formed on the optical recording medium 10 can be properly suppressed, and the reproducing performance or recording performance of the optical pickup device 1 can be improved.

Figure 8:
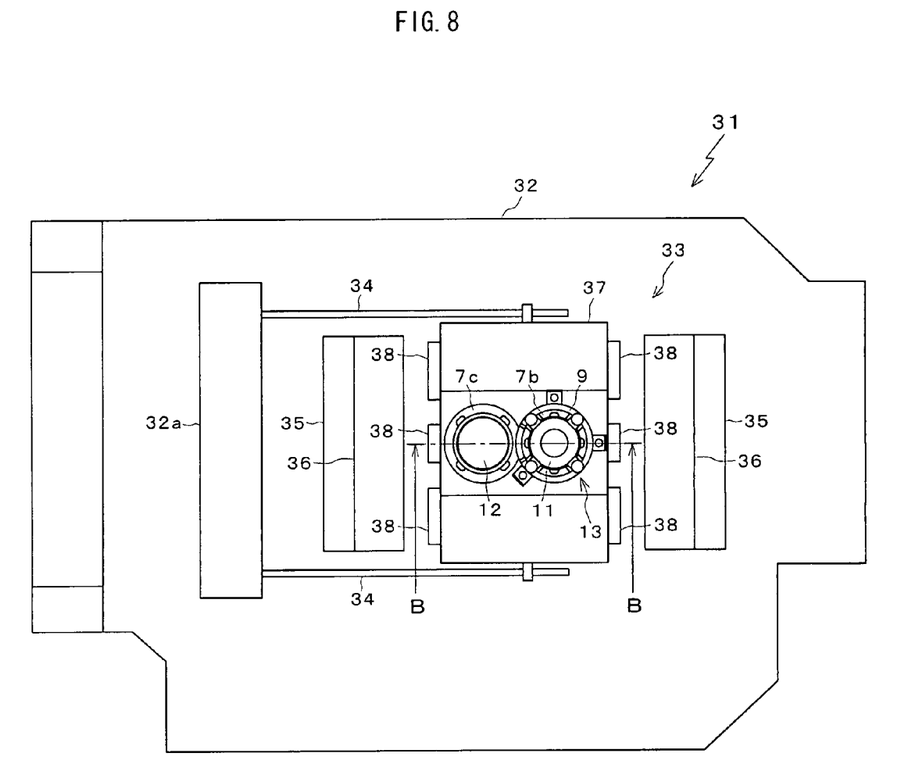
FIG. 8 is a plan view of an optical pickup device according to another embodiment.
Figure 9:
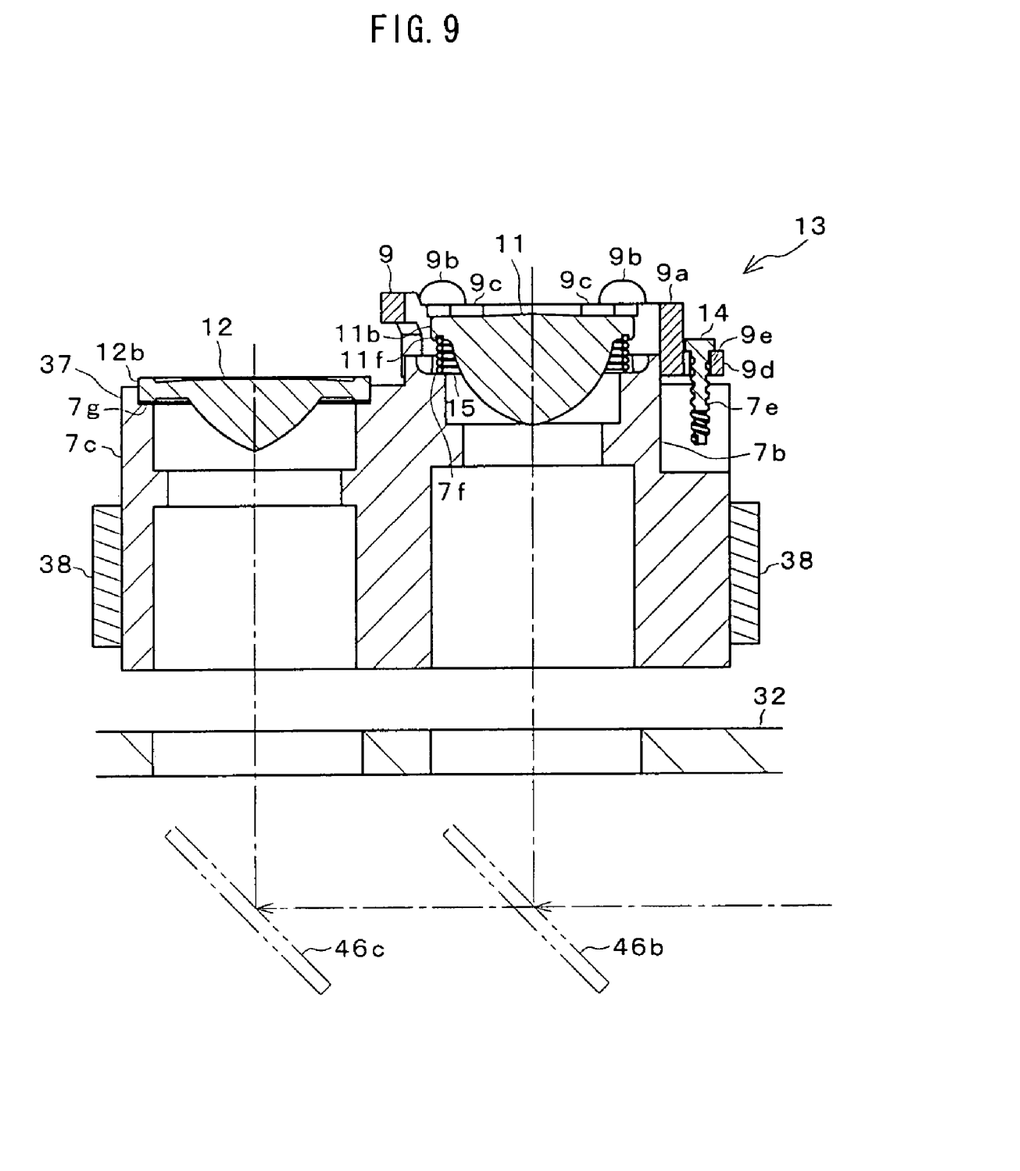
FIG. 9 is a cross section of the optical pickup device according to another embodiment.

The present invention is not limited to the foregoing embodiment and can employ other various modes. For example, in the foregoing embodiment, the invention is applied to the optical pickup device 1 of the shaft sliding type in which the lens holder 7 is rotatably supported by the shaft 5. The present invention can be also applied to an optical pickup device of a wire suspension type in which a lens holder is supported by wires so as to be movable in the vertical and horizontal directions. FIGS. 8 and 9 are diagrams showing an embodiment of this case. FIG. 8 is a plan view of an optical pickup device 31 of the wire suspension type. FIG. 9 is a cross section taken along line B-B of FIG. 8. The same reference numerals denote the same or corresponding parts in FIGS. 1 to 6.

A base 32 of the optical pickup device 31 is a fixed member which is fixed to a chassis of a disc player or the like. As shown in FIG. 8, an actuator 33 is attached onto the base 32. A pair of yokes 35 of the actuator 33 is fixed onto the base 32. Magnets 36 are fixed to the facing side surfaces of the yokes 35. A lens holder 37 between the yokes 35 is supported by a plurality of wires 34 fixed to a wall 32a on the base 32. Magnet coils 38 are fixed to the side surfaces facing the magnets 36 of the lens holder 37. By the magnetic fields between the magnet coils 38 and the magnets 36, the objective lenses 11 and 12 are moved together with the lens holder 37 in the focusing direction or the tracking direction to perform the focusing servo or the tracking servo. In the center of the lens holder 37, the lens receiving cylindrical parts 7b and 7c are provided. The objective lenses 11 and 12 having different optical characteristics are attached to the lens receiving cylindrical parts 7b and 7c respectively so that the distance between the objective lens 11 and the optical recording medium becomes shorter than the distance between the objective lens 12 and the optical recording medium without overlapping the objective lenses 11 and 12. The buffer member 9 is attached to the upper part of the lens receiving cylindrical part 7b. The lens tilt adjusting and holding structure 13 is added to the buffer member 9 and the lens receiving cylindrical part 7b.

The optical recording medium is set in a fixed position above the objective lenses 11 and 12 in FIG. 9. The objective lens 12 is attached to the lens receiving cylindrical part 7c and fixed by an adhesive or the like as shown in FIG. 9. By adjusting the posture of attachment to the wall 32a of the wire 34, that is, the angle of attachment to the base 32 of the wire 34, the tilt of the objective lens 12 with respect to the optical recording medium and the base 32 is adjusted together with the lens holder 37, and coma aberration which occurs in the objective lens 12 is corrected. The objective lens 11 is held by the lens tilt adjusting and holding structure 13 attached to the buffer member 9 and the lens receiving cylindrical part 7b so that its tilt can be adjusted as shown in FIG. 9, and attached to the lens receiving cylindrical part 7b. The tilt of the objective lens 11 with respect to the optical recording medium, the lens holder 37, and the objective lens 12 is adjusted by the lens tilt adjusting and holding structure 13, and coma aberration which occurs in the objective lens 11 is corrected.

The configuration of the optical system of the optical pickup device 31 is the same as that shown in FIG. 2 except for the reflecting mirror 26. In the optical pickup device 31, two reflecting mirrors 46b and 46c shown in FIG. 9 are disposed in place of the reflecting mirror 26 between the objective lenses 11 and 12 and the prism 25. The reflecting mirror 46b reflects a laser beam having a short wavelength emitted from the light source 21 to allow the beam to enter the objective lens 11, and transmits a laser beam having a long wavelength emitted from the light source 22. The reflecting mirror 46c reflects a laser beam having a long wavelength emitted from the light source 22 to allow the beam to enter the objective lens 12.

Also in the optical pickup device 31 described above, after adjustment of a tilt of the objective lens 12 with respect to an optical recording medium, the tilt of the objective lens 11 with respect to the optical recording medium, the lens holder 37, and the objective lens 12 can be adjusted by the lens tilt adjusting and holding structure 13. Thus, coma aberration which occurs due to a relative tilt error between the objective lenses 11 and 12 when the components of the optical pickup device 31 are actually combined can be properly suppressed.

Although three through holes 9e, three female screw holes 7e, and three precision screws 14 are provided around the buffer member 9 and the lens receiving cylindrical part 7b of the lens holder 7 in the foregoing embodiment, the invention is not limited to such embodiment. Two or four or more of each of the through holes 9e, female screw holes 7e, and precision screws 14 may be provided around the buffer member 9 and the lens receiving cylindrical part 7b and the tilt of the objective lens 11 may be adjusted by adjustment of the screw amount of the precision screw in a proper position.

Although the elastic force of pressing the objective lens 11 toward the optical recording medium 10 is generated in the foregoing embodiment, the invention is not limited to such embodiment. In place of the coil spring 15, for example, a plurality of small coil springs each having a diameter smaller than the width of the engagement parts 7f and 11f of the lens receiving cylindrical part 7b and the objective lens 11 may be provided for the engagement parts 7f and 11f or a plate spring, a ring spring, or the like may be provided for the engagement parts 7f and 11f.

In the foregoing embodiment, the example of applying the present invention to the optical pickup device 1 including the two objective lenses 11 and 12 having different optical characteristics has been described. The present invention can be also applied to an optical pickup device including three or more objective lenses having different optical characteristics.

What is claimed is:

1. An optical pickup device comprising:
    a first objective lens configured to condense a laser beam having a short wavelength onto an optical recording medium;
    a second objective lens configured to condense a laser beam having a long wavelength onto an optical recording medium;
    a lens holder provided with first and second lens receiving cylindrical parts to which the first and second objective lenses are attached, respectively, so that distance from the first objective lens to the optical recording medium becomes shorter than distance from the second objective lens to the optical recording medium without overlapping the objective lenses;
    a slidable buffer member formed in a cylindrical shape so as to surround the periphery of the first objective lens and having a projection configured to prevent collision between the first objective lens and the optical recording medium, the projection being provided at an end on the optical recording medium side;
    a lens tilt adjusting and holding structure configured to hold the first objective lens so that tilt of the first objective lens is adjustable,
    wherein the second objective lens is fixed in the second lens receiving cylindrical part,
    and
    wherein the lens tilt adjusting and holding structure comprises:
        a support part provided on an inner face of the buffer member and supporting the first objective lens from the optical recording medium side;
        a flange provided on an outer face of the buffer member; three through holes provided at equal angle intervals in the flange;
        three female screw holes provided at equal angle intervals around the first lens receiving cylindrical part of the lens holder;

three screws that penetrate the through holes and screw in the female screw holes, thereby attaching the buffer member to the lens holder; and a spring provided between the first objective lens and the first lens receiving cylindrical part and generating elastic force of pressing periphery of the first objective lens toward the optical recording medium, the spring being arranged concentrically with the first objective lens and supported between a first engagement part formed at a circumferential end of the first objective lens and a second engagement part formed on an upper part of the first lens receiving cylindrical part.

2. An optical pickup device comprising:

first and second objective lenses having different optical characteristics;

a lens holder provided with first and second lens receiving cylindrical parts to which the first and second objective lenses are attached, respectively, so that distance from the first objective lens to an optical recording medium becomes shorter than distance from the second objective lens to the optical recording medium without overlapping the objective lenses;

a buffer member formed in a cylindrical shape so as to surround the periphery of the first objective lens and having a projection configured to prevent collision between the first objective lens and the optical recording medium, the projection being provided at an end on the optical recording medium side; and a lens tilt adjusting and holding structure configured to hold the first objective lens so that tilt of the first objective lens is adjustable, wherein the second objective lens is fixed in the second lens receiving cylindrical part, and wherein the lens tilt adjusting and holding structure comprises a spring provided between the first objective lens and the first lens receiving cylindrical part and generating elastic force of pressing periphery of the first objective lens toward the optical recording medium, the spring being arranged concentrically with the first objective lens and supported between a first engagement part formed at a circumferential end of the first objective lens and a second engagement part formed on an upper part of the first lens receiving cylindrical part.

3. The optical pickup device according to claim 2, wherein the lens tilt adjusting and holding structure further comprises:

a support part provided on an inner face of the buffer member and supporting the first objective lens from the optical recording medium side;

a flange provided on an outer face of the buffer member;

a through hole provided in the flange;

a female screw hole provided around the first lens receiving cylindrical part of the lens holder; and a screw that penetrates the through hole and screws in the female screw hole, thereby attaching the buffer member to the lens holder.

4. The optical pickup device according to claim 3, wherein a plurality of through holes, a plurality of female screw holes, and a plurality of screws are provided at predetermined angle intervals around the buffer member and the first lens receiving cylindrical part.

* * * * *